United States Patent [19]

Crain

[11] 4,385,849
[45] May 31, 1983

[54] EXTENSIBLE AND RETRACTABLE ROD

[75] Inventor: Stephen B. Crain, Mound City, Ill.

[73] Assignee: Crain Enterprises, Inc., Mound City, Ill.

[21] Appl. No.: 230,339

[22] Filed: Feb. 2, 1981

[51] Int. Cl.³ .............................................. F16B 7/10
[52] U.S. Cl. .................................... 403/109; 81/53.1; 343/901
[58] Field of Search ............... 403/109, 317, 324, 328; 294/19 R; 81/53.1, 177 A, 177 N; 343/901, 902; 248/654

[56] References Cited

U.S. PATENT DOCUMENTS

| | | | |
|---|---|---|---|
| 2,291,593 | 7/1942 | Hubbard | 403/109 X |
| 2,319,992 | 5/1943 | Hubbard | 403/109 X |
| 2,344,425 | 3/1944 | Snyder | 403/109 X |
| 2,606,050 | 8/1952 | Morris et al. | 403/328 |
| 2,980,456 | 4/1961 | McMullin | 287/58 |
| 3,103,375 | 9/1963 | McMullin | 287/58 |
| 3,980,409 | 9/1976 | Turner | 403/328 X |
| 4,047,821 | 9/1977 | Hoke et al. | 403/109 |
| 4,079,978 | 3/1978 | McMullin | 403/109 X |

Primary Examiner—Wayne L. Shedd
Attorney, Agent, or Firm—Senniger, Powers, Leavitt and Roedel

[57] ABSTRACT

An extensible and retractable rod comprising an outer tubular section and an inner section of substantially constant outside diameter telescopically received in the outer section for extension and retraction relative thereto. The outer section has a first internal shoulder spaced from but relatively close to one end of the section, and a second internal shoulder spaced substantially farther away from said one end, said outer section being dimensioned to have a first inside diameter between said one end of the section and the first shoulder, a second inside diameter greater than the first between the first and second shoulders, and a third inside diameter greater than the second between the second shoulder and the other end of the section. The first inside diameter of the outer section is dimensioned for a relatively close clearance fit between the sections, and the second inside diameter of the outer section is dimensioned for a relatively loose clearance fit between the sections. The inner section has a stop at one end thereof engageable with the second shoulder of the outer section for limiting extension of the two sections relative to one another. The inner section may be releasably locked in an extended position relative to the outer section, with the relatively close clearance fit between the sections rigidly holding the sections in generally coaxial alignment.

20 Claims, 5 Drawing Figures

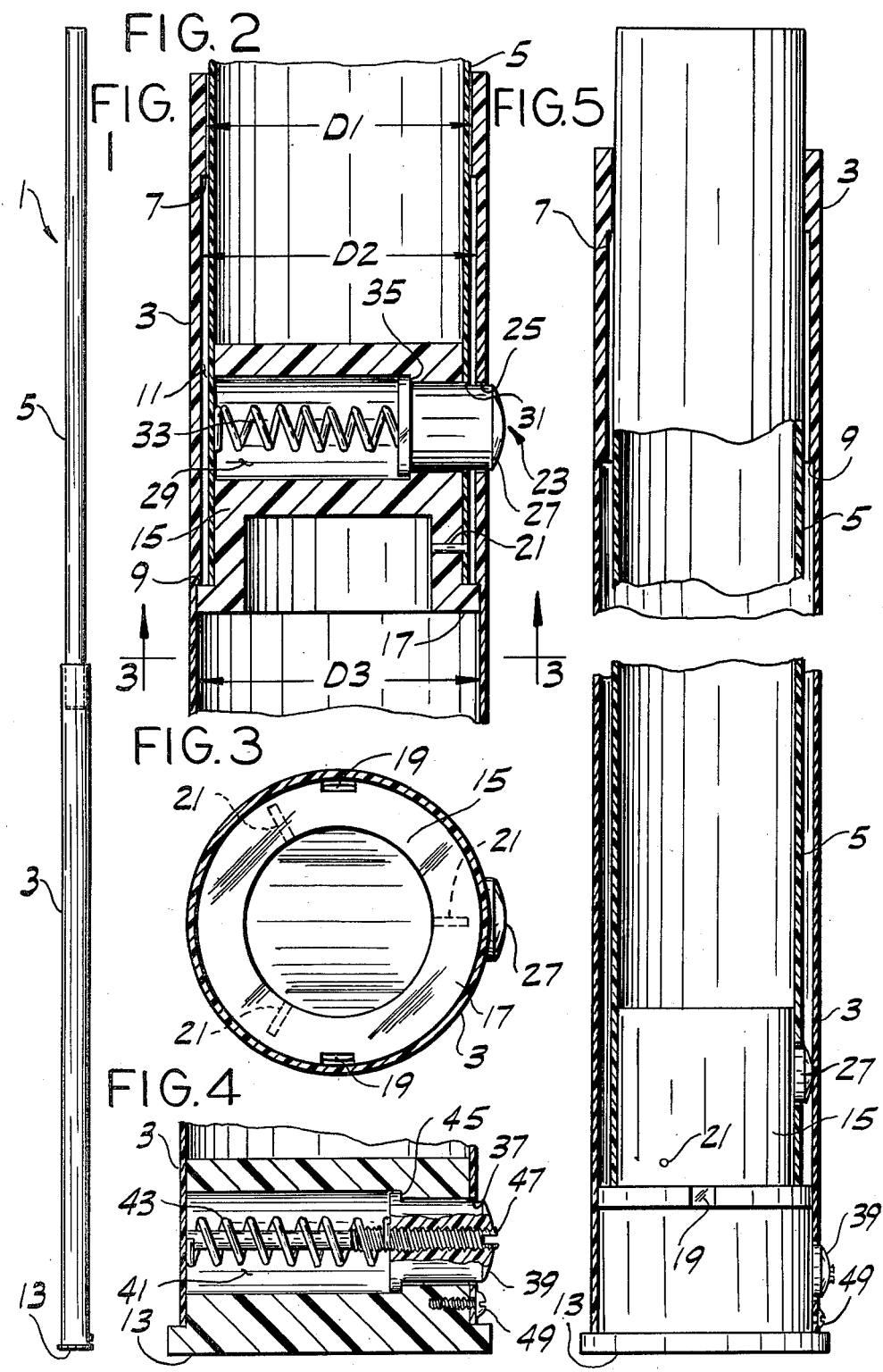

EXTENSIBLE AND RETRACTABLE ROD

BACKGROUND OF THE INVENTION

This invention relates generally to multisection telescoping rods and, more particularly, to telescoping measuring rods (e.g., leveling rods).

When the telescoping sections of a measuring rod are extended, it is important that they be rigidly held in coaxial alignment, with each section being firmly supported within the next larger section. Heretofore such stability has been achieved by sizing each section so that, when fully extended, a substantial portion of the section remains in the next larger section of the rod and has a close clearance fit therewith. While this construction has provided the necessary rod rigidity, the substantial amounts of friction generated in the close clearance fit areas as the sections are telescoped in and out has resulted in excessive wear of the rod sections and has made the sections rather difficult to extend and retract with respect to one another. The large area of close clearance fit has also increased the expense of the rods.

Reference may be made to U.S. Pat. Nos. 2,980,456 and 3,103,375 describing telescoping poles generally in the field of this invention.

SUMMARY OF THE INVENTION

Among the several objects of this invention may be noted the provision of an improved telescoping rod which is rigid and stable when fully extended; the provision of such a rod which is easy to extend and collapse; the provision of such a rod which is dielectric, enabling it to be safely used around electric power lines and the like; the provision of such a rod which is pleasing in appearance and relatively inexpensive to manufacture; and the provision of such a rod which is durable in use.

Generally, an extensible and retractable rod of this invention comprises an outer tubular section and an inner section of substantially constant outside diameter telescopically received in the outer section for extension and retraction relative thereto. The outer section has a first internal shoulder spaced from but relatively close to one end of the section, and a second internal shoulder spaced substantially farther away from said one end, said outer section being dimensioned to have a first inside diameter between said one end of the section and the first shoulder, a second inside diameter greater than the first between said first and second shoulders, and a third inside diameter greater than the second between the second shoulder and the other end of the section. The first inside diameter of the outer section is dimensioned for a relatively close clearance fit between the sections, and the second inside diameter of the outer section is dimensioned for a relatively loose clearance fit between the sections. The inner section has stop means at one end thereof engageable with the second shoulder of the outer section for limiting extension of the two sections relative to one another. Means is provided for releasably locking the inner section in an extended position relative to the outer section, with the relatively close clearance fit between the sections rigidly holding the sections in generally coaxial alignment.

BRIEF DESCRIPTION OF THE DRAWINGS

FIG. 1 is an elevation of a two-section extensible and retractable rod of the present invention, the upper section being shown extended with respect to the lower section;

FIG. 2 is an enlarged sectional view of a portion of FIG. 1 showing a spring detent for locking the upper section in extended position;

FIG. 3 is a horizontal section taken on line 3—3 of FIG. 2;

FIG. 4 is an enlarged sectional view of a portion of FIG. 1 showing a spring detent for securing a plug in the end of the lower section; and FIG. 5 is an enlarged sectional view of a portion of FIG. 1, showing the upper section retracted inside the lower section.

Corresponding reference characters indicate corresponding parts throughout the several views of the drawings.

DESCRIPTION OF A PREFERRED EMBODIMENT

Referring now to the drawings, a measuring rod of the present invention, designated in its entirety by the reference numeral 1, is shown as comprising a plurality of cylindrical, substantially concentric tubular sections of the same length but progressively smaller in size, telescopically assembled for extension and retraction relative to one another. By way of example, two tubes 3,5 have been shown in the drawings. However it will be understood that more tubular sections may be used. The outside diameter of each section is substantially constant.

In accordance with this invention, the construction of the rod is such that when fully extended the two sections 3,5 are stably held in coaxial alignment. More specifically, the outer (or base) section 3 has two internal shoulders adjacent its upper end, which is open to receive the inner section 5 therein (see FIGS. 2 and 5). The first shoulder, designated 7, is spaced from but relatively close to the upper end of section 3, while the second shoulder, designated 9, is spaced farther away below the first shoulder. Section 3 has a substantially constant first inside diameter D-1 between the upper end of the section and the upper shoulder 7, a second substantially constant inside diameter D-2 greater than the first D-1 between the upper shoulder 7 and the lower shoulder 9, and a third substantially constant inside diameter D-3 between the lower shoulder and the lower end of the rod. Diameter D-1 is sized for a close clearance fit between the sections and D-2 for a relatively loose clearance fit between the sections, an annular gap 11 thus being formed between the sections in the area between the upper and lower internal shoulders 7, 9 of the base section 3.

The lower ends of the tubular sections 3,5 are closed by plugs, the plug in the largest diameter section 3 being designated 13 and the plug in the upper section 5 being designated 15. The latter plug is formed with an integral peripheral flange 17 at its bottom extending radially outwardly beyond the outer surface of the section. The outside diameter of flange 17 is less than diameter D-3 of the base section but greater than diameter D-2 for engagement of the flange with the lower internal shoulder 9 of the base section, flange 17 thus constituting stop means for limiting extension of the two sections relative to one another. It is preferable that the diameter of flange 17 be only slightly less than diameter D-3 for ensuring a close fit of the flange at its periphery inside the larger section. Flange 17 also has a plurality (e.g., two) of notches 19 therein, the purpose of which will appear hereinafter. Three pins, each designated 21, also serve to secure the plug 15 in position inside the lower end of section 5.

Indicated generally at 23 in FIG. 2 is means for releasably locking the upper section 5 in an extended position relative to the base section 3. This means comprises an opening 25 in the base section between the first and second internal shoulders 7,9, and a detent pin 27 (constituting detent means) mounted in a diametrical bore 29 in plug 15 in the upper section 5 for radial movement between a retracted position (FIG. 5) in which the sections are extensible and retractable relative to one another, and an extended position (FIG. 2) in which it projects through an opening 31 in the upper section and thence through the opening 25 in the base section for locking the upper section in extended position with respect to the base section. Means 23 also includes a coil compression spring 33 inside the plug bore 29 for biasing the detent pin 27 toward its extended position. The pin is formed for engagement with an internal shoulder 35 in the plug bore for restricting the outward (rightward as viewed in FIG. 2) movement of the pin.

To lock the upper section 5 in extended position with respect to the outer base section 3, section 5 is pulled upwardly until flange 17 engages the lower internal shoulder 9 of section 3, and then twisted until openings 25 and 31 are in registry, whereupon detent pin 27 springs through the opening 25 in the outer section for locking the sections together. When in this position, the upper section is held in rigid coaxial alignment with respect to the base section by means of its close clearance fit with the base section in the area between the upper end of the base section and the upper internal shoulder 7 of that section. The fact that the flange 17 of plug 15 in the upper section has a close fit inside the base section also assists in ensuring rod rigidity. On the other hand, the fact that there is a loose clearance fit between the sections in the area between internal shoulders 7 and 9 results in a reduction in the amount of friction generated as the sections 3,5 are extended and retracted relative to one another, thereby making the sections easier to telescope in and out and reducing the wear on the sections. This loose clearance fit in this area also avoids binding of the sections as they are extended with respect to one other. The reduced wall thickness of each section in the area between the internal shoulders 7 and 9 as compared to the area between the upper end of the section and the first shoulder also decreases the amount of material (e.g., fiberglass) required to make the section, with a consequent decrease in the cost of making the rod.

As shown best in FIG. 4, the plug 13 in the lower end of the largest diameter (base) section 3 is secured in place by means comprising an opening 37 in the section adjacent its lower end and a button 39 mounted in a bore 41 extending diametrically through plug 13 for movement in the radial direction with respect to the base section between a retracted position (not shown) in which the plug is removable from the section and an extended position (FIG. 4) in which the button extends through the opening 37 in the base section for securing the plug in position. The button is urged toward its extended position by a coil compression spring 43 in bore 41 reacting at one end against the wall of the base section and at its other end against the button, the latter of which is formed for engagement with an internal shoulder 45 in bore 41 for restricting the outward (rightward as viewed in FIG. 4) movement of the button in bore 41. A relatively long locking screw (or screw member) 47 may be threaded axially through button 39 and bore 41 for engagement with the wall of the base section to lock the button in its extended position. A second smaller screw 49 is also provided to assist in securing the base plug 13 in place.

When the rod of the present invention is collapsed from its fully extended position, the closed lower end of the upper section 5 moves from a position adjacent the upper end of the base section 3 (FIG. 2) to a position in which it is closely adjacent the closed lower end of the base section (FIG. 5). As the upper section is retracted into the lower section, air trapped between the closed ends of the sections is vented through the notches 19 in flange 17 into the annular space 11 between the sections and thence to atmosphere. The rush of air through this space 11 serves to blow any dirt and grit out from between the rod sections. This reduces abrasion of the rod sections as they are extended and retracted.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. An extensible and retractable rod comprising an outer tubular section and an inner section of substantially constant outside diameter telescopically received in the outer section for extension and retraction relative thereto, said outer section having a first internal shoulder spaced from but relatively close to one end of the section, and a second internal shoulder spaced substantially farther away from said one end, said outer section being dimensioned to have a first inside diameter between said one end of the section and the first shoulder, a second inside diameter greater than the first between said first and second shoulders, and a third inside diameter greater than the second between said second shoulder and the other end of the section, said first inside diameter of the outer section being dimensioned for a relatively close clearance fit between the sections, and said second inside diameter of the outer section being dimensioned for a relatively loose clearance fit between the sections, said inner section having stop means at one end thereof engageable with said second shoulder of the outer section for limiting extension of the two sections relative to one another, and means for releasably locking the inner section in an extended position relative to the outer section, with said relatively close clearance fit between the sections rigidly holding the sections in generally coaxial alignment.

2. A rod as set forth in claim 1 wherein the outside diameter of each section is substantially constant.

3. A rod as set forth in claim 1 wherein said means for locking the inner section in extended position relative to the outer section comprises an opening in the outer section between said first and second shoulder, and detent means associated with the inner section adjacent its said one end, said detent means being receivable in said opening when the inner section is in said extended position for locking the sections with respect to one another.

4. A rod as set forth in claim 3 wherein said detent means comprises a detent pin mounted for radial movement with respect to said sections between a retracted position in which the inner section is extensible and retractable relative to the outer section, and an extended position in which the pin is received in said opening for locking the inner section in said extended position, and spring means for biasing the pin into said opening.

5. A rod as set forth in claim 1 wherein said stop means comprises a flange extending radially outwardly from said inner section, the outside diameter of said flange being less than said third inside diameter of the outer section but greater than said second inside diameter for engagement of the flange with said second internal shoulder of the outer section.

6. A rod as set forth in claim 5 wherein said flange extends around substantially the entire periphery of the inner section and has a close clearance fit inside the outer tubular section.

7. A rod as set forth in claim 6 further comprising a plug closing said other end of the outer section, said one end of the inner section also being closed whereby the flow of air therethrough during retraction of the inner section into the outer section is blocked, said flange on the inner section having an opening therein whereby during said retraction air trapped between the closed ends of the respective sections is vented through said flange opening into the annular space between the sections and thence to atmosphere.

8. A rod as set forth in claim 7 wherein said flange has a plurality of notches therein for venting said trapped air therethrough.

9. A rod as set forth in claim 7 wherein said inner section is tubular and its said other end is closed by a plug, said flange being integrally formed with the plug.

10. A rod as set forth in claim 1 further comprising a plug in said other end of the outer section.

11. A rod as set forth in claim 10 wherein said means for locking the inner section in an extended position relative to the outer section comprises an opening in the outer section between said first and second shoulders, a detent pin mounted in said plug in said one end of the inner section for radial movement with respect to the inner section between a retracted position in which the inner section is extensible and retractable relative to the outer section, and an extended position in which the pin is received in said opening for locking the inner section in its said extended position, and spring means for biasing said detent pin toward said extended position.

12. A rod as set forth in claim 10 further comprising means for securing the plug in said other end of the outer section.

13. A rod as set forth in claim 12 wherein said securing means comprises an opening in said outer section adjacent its said other end, a button mounted in said plug for radial movement with respect to the outer section between a retracted position in which the plug is removable from the section and an extended position in which the button extends through said opening in the section for securing the plug in position, spring means for urging the button toward its extended position, and means for selectively locking the button in its extended position.

14. A rod as set forth in claim 13 wherein said locking means comprises a screw member threaded through said button.

15. A rod as set forth in claim 14 wherein said button is received in a bore in said plug, and said spring means comprises a coil compression spring in said bore reacting at one end against the plug and at its other end against the button for urging the latter toward its extended position, said screw member being adapted to be threaded through the button and into the bore for engagement with the plug to lock the button in its extended position.

16. An extensible and retractable rod comprising an outer tubular section open at one end and closed at its other end, and an inner section closed at one end and telescopically received in the outer section for movement between a retracted position in which its closed end is relatively close to the closed end of the outer section and an extended position in which its closed end is farther away from the closed end of the outer section, said inner section having a flange extending radially outwardly therefrom at its closed end, the outside diameter of the flange being sized for a relatively close fit of the flange at its periphery with the inside of the outer section, said flange having an opening therein whereby during retraction of the inner section into the outer section, air trapped between the closed ends of respective sections is vented through the flange opening into the annular space between the sections and thence to atmosphere.

17. A rod as set forth in claim 16 wherein said flange has a plurality of notches therein for venting said trapped air therethrough.

18. A rod as set forth in claim 16 wherein said one end of the inner section is closed by a plug, said flange being integrally formed with the plug.

19. A rod as set forth in claim 18 wherein said outer section has an internal shoulder spaced from its open end, said flange on the inner section being engageable with the shoulder for limiting the extension of the sections relative to one another.

20. A rod as set forth in claim 19 further comprising means for releasably locking the inner section in an extended position relative to the outer section, said means comprising an opening in the outer section between said shoulder and the open end of the section, a detent pin mounted in said plug in said one end of the inner section for radial movement with respect to the inner section between a retracted position in which the inner section is extensible and retractable relative to the outer section, and an extended position in which the pin is received in said opening for locking the inner section in its said extended position, and spring means for biasing said detent pin toward said extended position.

* * * * *